March 1, 1932.  A. YTTERBERG  1,847,585
ELECTRIC POWER PLANT WITH A PLURALITY OF GENERATORS
PROVIDED WITH AUTOMATIC VOLTAGE REGULATION
Filed Oct. 11, 1929

Inventor
Arle Ytterberg.
per W. Wallace White Attorney.

Patented Mar. 1, 1932

1,847,585

UNITED STATES PATENT OFFICE

ARLE YTTERBERG, OF HOGBERGET, SWEDEN, ASSIGNOR TO ALLMÄNNA SVENSKA ELEK-
TRISKA AKTIEBOLAGET, OF VASTERAS, SWEDEN, A CORPORATION OF SWEDEN

ELECTRIC POWER PLANT WITH A PLURALITY OF GENERATORS PROVIDED WITH
AUTOMATIC VOLTAGE REGULATION

Application filed October 11, 1929, Serial No. 398,876, and in Sweden October 15, 1928.

When two or more alternating current generators operating in parallel are provided with automatic voltage regulators adapted to keep the voltage on the generator terminals constant, it cannot always be avoided that one or more of the machines will be overexcited so as to deliver also a portion of the reactive power necessary for the other machines which are underexcited. The reason therefore is that the voltage drop caused in the overexcited machine by the reactive current thus circulating and the corresponding voltage rise in the underexcited machines will completely cover the difference in induced voltage so that the regulators will not in any way feel the difference of excitation. This indefinite distribution of the reactive load is of course an inconvenience. It has previously been proposed to overcome this inconvenience by providing the regulators with a compounding device which keeps the generator voltage constant only for a certain phase angle. This has, however, had the consequence that the voltage of the station has been strongly dependent on the power factor in the line which should be avoided if possible.

According to the present invention, the desired result of avoiding equalizing reactive currents is achieved by arranging the regulator of each generator to be influenced by the individual generator current in such way as to lower the excitation under the influence of a reactive current flowing from the generator, and by the outgoing line current or currents by means of a compounding impedance acting to raise the excitation. The last-mentioned compounding impedance may either be so arranged as to only compensate the voltage-lowering action of the individual generator compounding, if the voltage on the outgoing lines shall be kept constant at the generating station, or correspondingly stronger if the voltage shall be constant at a point at some distance from the station.

Figure 1:
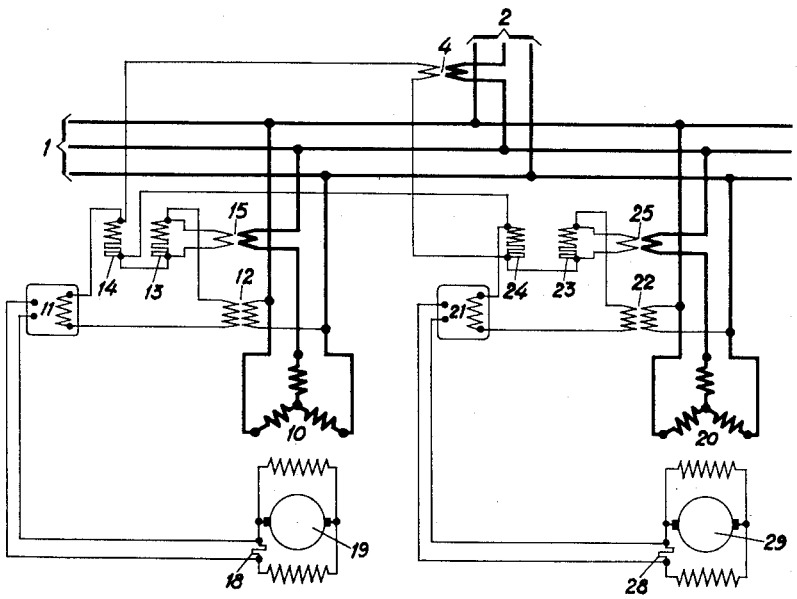
Figure 2:
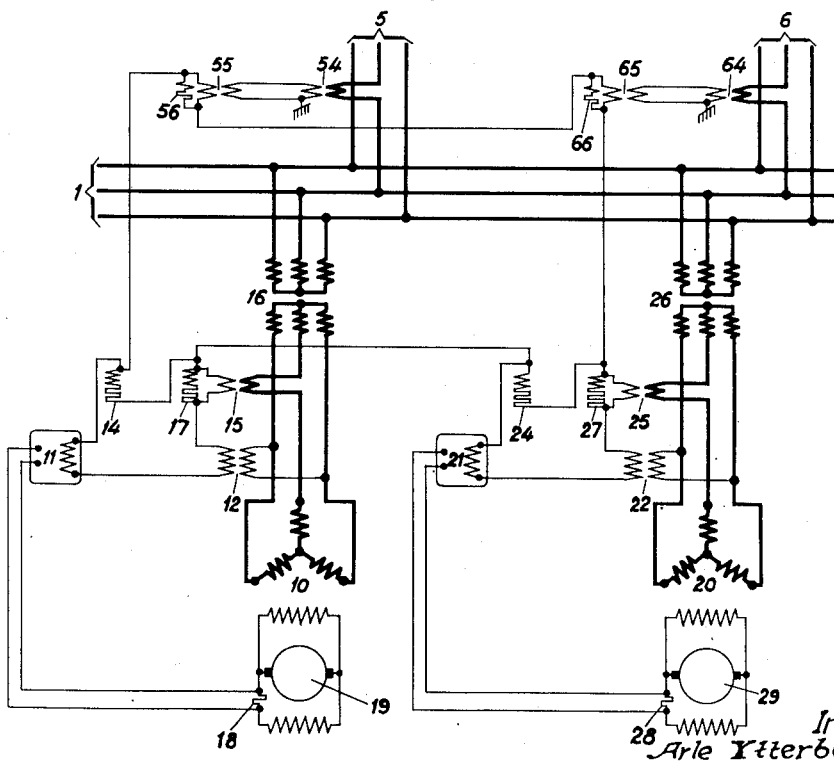

Three forms of the invention are diagrammatically illustrated in the accompanying drawings in Figs. 1, 2 and 3.

In Fig. 1, two generators 10, 20 operate directly on a bus bar system 1 with an outgoing line 2. Each of the generators is provided with a voltage regulator 11, 21, respectively, which is of the well-known kind acting to short-circuit intermittently a resistance 18, 28, respectively, in the field circuit of an exciter 19, 29, respectively, for the generator. The regulator is influenced by a voltage which is composed by the voltage from a voltage transformer 12, 22, respectively, and the voltages from two so-called compounding impedances 13, 14 and 23, 24, respectively, between the terminals of which voltages proportional to the traversing currents are produced. One 13, 23, respectively, of these impedances is traversed by the current from a current transformer 15, 25, respectively, which is inserted directly in the connection between the generator 10, 20, respectively, and the bus bars 1. The other impedance 14, 24, respectively, is traversed by the current from a current transformer 4 in the outgoing line 2. The impedances 13, 14 and 23, 24 are composed by inductances and resistances, preferably adjustable and at any rate so arranged, that the action of the impedances 13, 23 on the regulators will be practically independent of the active current from the machines but influenced by the reactive current in such sense that an increase of outgoing reactive current will lower the excitation. The impedances 14 and 24 should on the contrary be so adjusted as to compensate, for each load, the voltage drop caused by the impedances 13 and 23 and, as the case may be, the voltage drop in a portion of the line, if the voltage shall be kept constant at a corresponding distance from the station.

As the regulator is assumed to be so arranged as to tend to keep constant the voltage impressed thereupon, it is obviously always possible—by choosing the portion of the compounding impedances 14, 24, respectively, corresponding to the line, so as to give a voltage drop exactly corresponding to the real voltage drop in a certain line section—to obtain a constant voltage at the end of this section for all loads.

In Fig. 2, transformers 16, 26, respectively, are connected between the generators 10, 20, and the bus bar system 1. The voltage on the secondary side of these transformers should obviously be the same for both units, and for preventing too large variations of this voltage the machines should be compounded with respect to this condition. This is made by the compounding impedances 17, 27, respectively, which are fed from current transformers 15, 25, respectively, in the outgoing generator leads. In order to prevent the formation of reactive equalizing currents these impedances should, however, be so dimensioned as not to compound for the whole voltage drop in the transformers. In some cases they may be entirely omitted.

In order to compensate the aforesaid uncompensated voltage drop and, as the case may be, a certain voltage drop in the lines, compounding impedances 14, 24 traversed by currents proportional to the line currents are used here as in Fig. 1. In the case of more than one line, the current through said impedances should be equal to the arithmetical medium between the line currents. This can be accomplished by series connecting the current transformers feeding the impedances. As the current transformers 54, 64 in the lines 5, 6 for the reason of safety should be individually grounded on the low tension side, they can not be directly series-connected, but instead of that intermediary current transformers 55, 65 are employed and connected with their secondary windings in series. In order to avoid too high saturation in the said current transformers if the line currents should differ too much from each other, they may be provided with parallel resistances 56, 66.

In Fig. 3 the two impedances connected in series to the same regulators are combined in one, having different portions fed by the different current transformers which portions also have parts common to both current transformers. The combined impedance substituting those referred to as 14 and 17 in Fig. 2 is marked 14' and the corresponding one for the second generator is marked 24' in Fig. 3.

I claim as my invention:—

1. In electric power plants, a plurality of alternating current generators, automatic voltage regulators acting on said generators, a bus bar system connecting together said generators, outgoing lines from said bus bar system, a potenial transformer measuring the generator voltage and connected to each regulator, a current transformer in the leads from each generator, an impedance fed by said current transformer and connected in series with said regulator, a current transformer in an outgoing line, and an impedance fed by said current transformer and connected in series with said regulator.

2. In electric power plants, a plurality of alternating current generators, automatic voltage regulators acting on said generators, a bus bar system connecting together said generators, outgoing lines from said bus bar system, a potential transformer measuring the generator voltage and connected to each regulator, a current transformer in the leads from each generator, an impedance fed by said current transformer and connected in series with said regulator and having such characteristics as to cause the regulator to regulate the reactive power delivered by said generator to said bus bar system, a current transformer in an outgoing line, and an impedance fed by said current transformer and connected in series with said regulator and having such characteristics as to cause the regulator to increase the excitation of said generator for an increasing load in the line.

3. In electric power plants, a plurality of alternating current generators, automatic voltage regulators connected to the terminals of said generators and acting on their excitation, a bus bar system connecting together said generators, a current transformer connected between each generator and the bus bar system, an impedance fed by said current transformer and connected in series with said voltage regulator and having such characteristics as to cause the regulator to compensate less than the reactive voltage drop between said generator and said bus bar system, a current transformer in an outgoing line, and an impedance fed by said current transformer and connected in series with said voltage regulator and having such characteristics as to cause the regulator to increase the excitation of the generators for an increasing load in the line.

In testimony whereof I have signed my name to this specification.

ARLE YTTERBERG.